Nov. 24, 1925.　　　　　　　　　　　　　　　　　　1,562,802
F. N. SPRAGUE
FRICTION CONTROLLED PAWL AND RATCHET OPERATED SHOCK
ABSORBER FOR AUTOMOBILES AND LIKE VEHICLES
Filed April 15, 1924　　　2 Sheets-Sheet 1
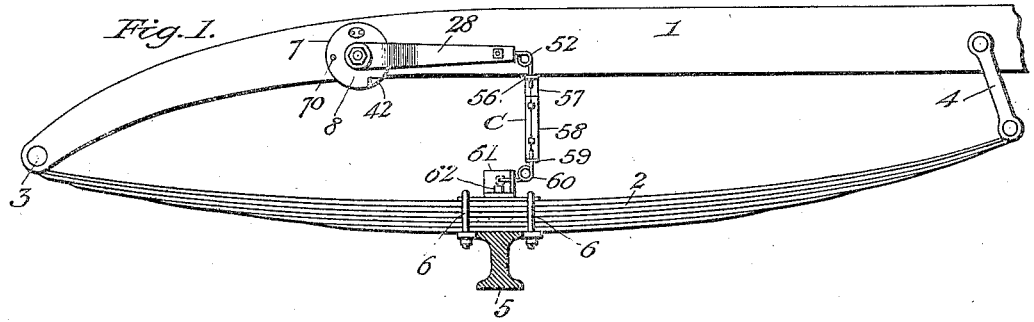
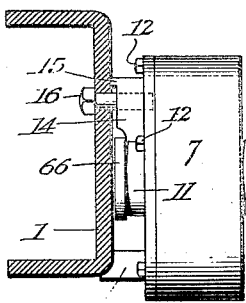
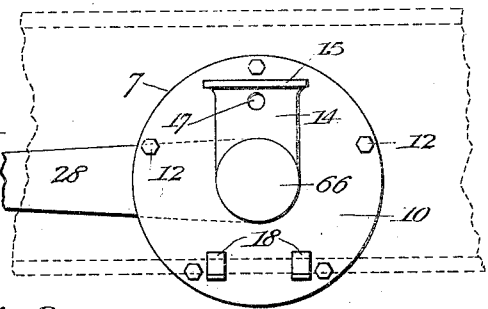
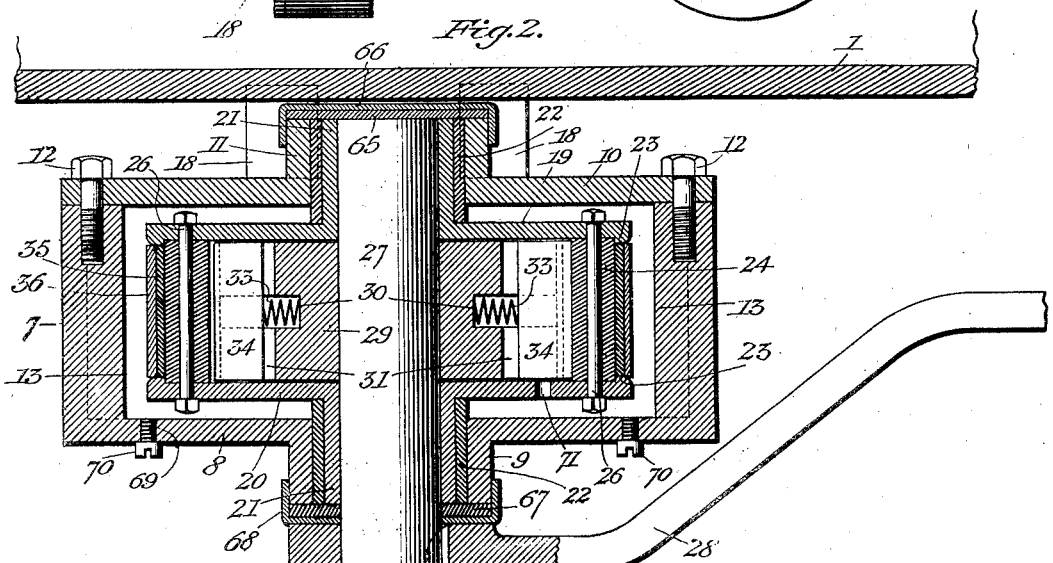
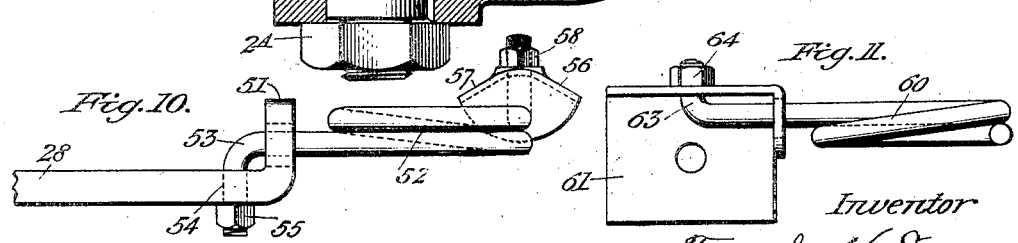

Nov. 24, 1925.  1,562,802
F. N. SPRAGUE
FRICTION CONTROLLED PAWL AND RATCHET OPERATED SHOCK
ABSORBER FOR AUTOMOBILES AND LIKE VEHICLES
Filed April 15, 1924   2 Sheets-Sheet 2
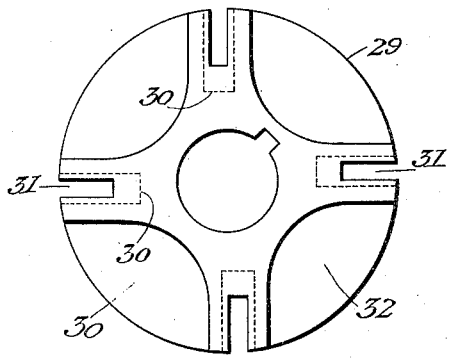
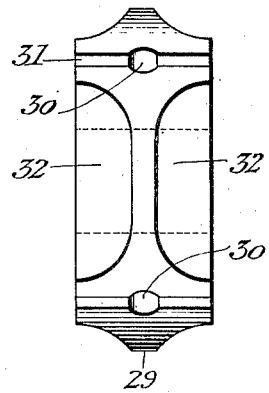
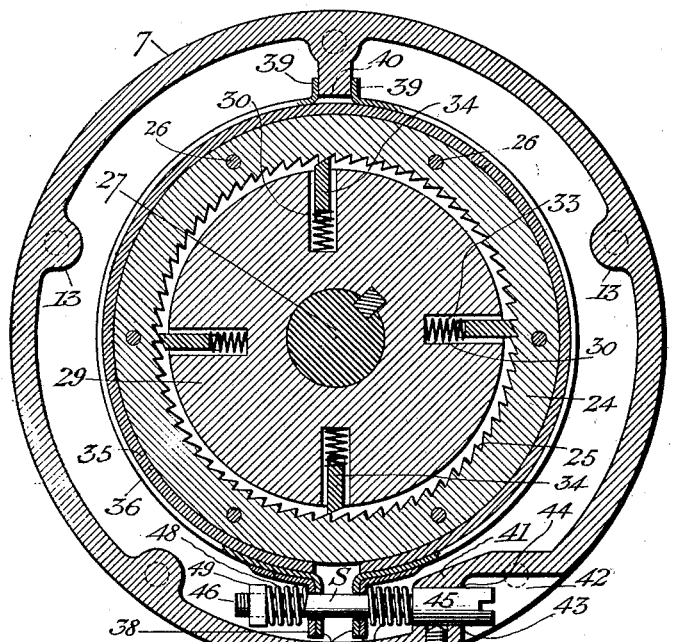
Inventor
Frank N. Sprague
By H. S. Bailey  Attorney.

Patented Nov. 24, 1925.

1,562,802

UNITED STATES PATENT OFFICE.

FRANK N. SPRAGUE, OF HOLYOKE, COLORADO.

FRICTION-CONTROLLED PAWL-AND-RATCHET-OPERATED SHOCK ABSORBER FOR AUTOMOBILES AND LIKE VEHICLES.

Application filed April 15, 1924. Serial No. 706,728.

*To all whom it may concern:*

Be it known that I, FRANK N. SPRAGUE, a citizen of the United States of America, residing at Holyoke, county of Phillips, and State of Colorado, have invented a new and useful Friction-Controlled Pawl-and-Ratchet-Operated Shock Absorber for Automobiles and like Vehicles, of which the following is a specification.

My invention relates to improvements in friction controlled, pawl and ratchet operated shock absorbers for automobiles and like vehicles.

The object of my invention is to provide a friction controlled and pawl and ratchet operated mechanism which is adapted to be connected to the side bar of a car and with the side spring, in such manner that the mechanism is actuated by the action of the side spring to instantly and gradually check the rebound of the spring and thus eliminate the violent upward throw of the car body.

Further to provide a shock absorber comprising a housing adapted to be rigidly secured to the side bar of a car, in which is mounted a friction controlled, pawl and ratchet, operated mechanism, said pawl and ratchet mechanism being actuated by a lever arm, which is connected to the side spring by a connecting rod, whereby the spring action is transmitted to the lever arm, the upward movement of said arm under compression of the spring causing the pawls to ride over the ratchets, while the rebound of the spring causes a pawl to engage a friction controlled ratchet ring, thereby to absorb the shock of the rebound.

These objects are accomplished by the mechanism illustrated in the accompanying drawings in which:

Figure 1 is a side view illustrating the application of the improved shock absorber to the front end of a side spring form of automobile, the spring and a portion only of the side bar being shown.

Figure 2 is a horizontal sectional view—full size—through the shock absorber.

Figure 3 is a central vertical longitudinal sectional view of the same.

Figure 4 is a bottom view thereof.

Figure 5 is a sectional view through the side bar of an automobile showing the shock absorber and the manner in which it is secured to the side bar.

Figure 6 is a view of the rear side of the shock absorber.

Figure 7 is a side view of the pawl block.

Figure 8 is an edge view of the same.

Figure 9 is an edge view of the brake band.

Figure 10 is a top view of the outer end portion of the lever arm, showing the manner of its connection with the upper end of the adjustable bar which connects the said lever arm with the side spring of the automobile.

Figure 11 is a plan view of the anchor plate to which the lower end of the adjustable bar is connected; and, Figure 12 is a view of a modified form of brake band-tightening screw.

Referring to the accompanying drawings:

The numeral 1, indicates the forward portion of the side bar of an automobile; 2, the semielliptic side spring, the forward end of which is connected to a bolt 3 in the forward end of the side bar, and its rear end to a shackle 4 which is pivotally connected to the side bar; and 5, the front axle to which the spring 2 is clamped in the usual manner by U-bolts 6; all of the above named parts being of common construction.

In carrying out my invention, I employ a housing 7 which is secured to the side bar 1 at a point either forward or rear of the axle, and which is constructed in the following manner: This housing is cylindrical in form and is closed on its front side by an integral head 8, having a central hub 9, while its rear end is closed by a cap 10 having a central hub 11, the said cap being secured to the housing by cap screws 12, which are screwed into threaded holes in enlargements or ribs 13 formed on the inner wall of the housing. The hub 11 of the cap is formed with an integral upward extension 14 having a horizontal head 15 on its upper end which is adapted to bear against the side bar 1, and a cap bolt 16 is passed through a hole in the side bar and screwed into a threaded hole 17 in the said extension 14. A pair of lugs 18 are formed on the cap 10 below the hub 11, and the ends of these lugs formed to bear against the face of the side bar and also against its under edge, as shown in Figure 5, so that when the cap bolt 16 is screwed to clamp the head 15 against the side bar, the lugs 18 are also clamped against the side bar, and the portions of the lugs which extend under the side bar will prevent a turning movement of the housing on the side bar.

Within the housing is mounted a pair of spaced disks 19 and 20, having hubs 21, which project into bushings 22 in the hubs 9 and 11 respectively of the housing and its cap, and each disk has formed on its inner face, an annular marginal lip 23. A ring 24 having internal ratchet teeth 25 lies between and spaces the disks 19 and 20, and fits within the marginal lips 23, and the said disks 19 and 20 are clamped to the ring by bolts 26 which pass through the disks and through the ring.

A shaft 27 is mounted in the hubs 21 of the disks 19 and 20; and one end of this shaft extends out beyond the hub of the disk 20 for the reception of a lever arm 28 to be presently described. A circular block 29, which constitutes a pawl-holding block, is keyed to the shaft 27, and is of slightly less diameter than the circle described by the points of the ratchet teeth 25, and this block is of slightly less thickness than the space between the disks 19 and 20, as shown in Figure 2.

Four equi-distant holes 30 extend into the block a suitable distance from its peripheral face, and these holes constitute spring pockets, and their axes are slightly tangent to the axial center of the block.

Transverse slots 31 are also formed in the block so as to intersect the pockets 30, but the slots 31 are of less width than the diameter of the pocket, and also of less depth than the pocket, and the thickness of the block is reduced between the slots to form recesses 32 in the opposite sides of the block, which permits of a supply of oil being placed in the chamber formed by the disks 19 and 20 and the ratchet ring 24, as will be hereinafter referred to.

A coil spring 33 is placed in each of the pockets 30, and a pawl 34 is inserted in each slot 31. These pawls are in the form of flat plates which fit slidably in the slots 31, and the length of each pawl equals the thickness of the block 29, and their outer ends are chisel-edged to correspond to the ratchet teeth 25. The pawls 34 are of less width than the depth of the slots 31, and they are held in resilient engagement with the ratchet teeth 25, by the coil springs 33 against which they are seated.

An uneven number of ratchet teeth is formed in the ring 24, and as the axes of the pawls 34 are slightly tangent to the axial center of the ratchet block 29, the ratchet-engaging point of each pawl will be in radial line with the axial center of the said ratchet block. By this arrangement one of the pawls is in engagement with a tooth, the next pawl to the left is one-fourth of the length of the tooth out of engagement, the next pawl is one-half of the length of a tooth out of engagement, and the last pawl is three-fourths of the length of a tooth out of engagement, as clearly shown in Figure 3. By this arrangement of the pawls, one of them is always in position to engage a ratchet tooth, on the operative movement of the ratchet block, thus reducing the lost motion of the block to a minimum.

Around the outer wall of the ratchet ring 24 is placed a brake lining 35, of the style of material in common use for such purposes, and the lining is surrounded by a resilient brake band 36, both the band and the lining lying between the marginal edges of the disks 19 and 20, as shown in Figure 2.

The brake band is a divided band, and the free ends thereof are bent outwardly at right angles to form ears 37, which are apertured; and these ears are reinforced by angle strips 38 which are brazed to the ears and to the band, and are also apertured to coincide with the ears. At the opposite point on the brake band from the ears 37, stops or abutments 39 are formed by cutting two parallel slits in the band, and a transverse slit connecting the two parallel slits, and then bending the two portions out at right angles to form the said abutments 39, as shown in Figures 3 and 9.

One of the enlargements or ribs 13, on the inner wall of the housing 7, is formed with an inwardly projecting lug 40, which is adapted to fit in between the two abutments 39, and thus hold the brake band at this point against rotary movement. At an opposite point from the lug 40, the circular wall of the housing 7 is formed with an abrupt transverse inwardly projecting step 41, and a recess 42 is formed in the said circular wall, which extends into the said step, thereby forming a wall 43 in the step which is provided with an aperture 44 in axial line with the apertures in the ears 37 of the brake band.

A specially constructed screw S, comprising an elongated head 45, and a shank 46, the end portion, only, of which is threaded, is passed through the hole 44 in the wall 43 and through the apertures in the ears 37 of the brake band, a coil spring 47 being first placed upon the shank of the screw so as to lie between the head of the screw and the adjacent ear 37 of the brake band, after which a coil spring 48 is placed on the end portion of the shank to bear against the other ear 37, and a nut 49 is screwed upon the shank and against the spring 48, or rather, the shank is screwed into the nut 49, which is held against rotation by engagement with the circular wall of the casing.

By turning the screw S the spring 47 is compressed between the head of the screw and the adjacent ear 37 of the brake band, thereby exerting a resilient pressure against the said ear, and at the same time, the nut 49 which cannot rotate, is drawn inward against the spring 48, thereby exerting a resilient pressure against the adjacent ear 37, and the spring pressure on the two ears 37 causes the brake band to grip the brake lining 35 with the necessary pressure for the purpose intended. When the screw S is turned to give the necessary gripping power to the brake band, the said screw is held against rotation by a set screw 50, which is screwed into a threaded aperture in the step wall 43, and against the elongated head of the screw S, as shown in Figure 3; and any rotary slipping movement of the band is prevented by the engagement of the brake band stops 39 with the lug 40 on the housing wall, as previously mentioned.

The lever arm 28 is keyed to the outer end portion of the shaft 27, and is held upon the shaft by a nut $2^A$, which is screwed upon the reduced and threaded end of the shaft, and against the hub of the arm.

The lever arm is bent inward and then in a straight rearward direction, and terminates in a short right-angle bend 51 in line with the forward axle 5. One end of a spring coil 52 is passed through a hole in the bend 51 and is given a right-angled bend 53, and the end of the bend 53 is threaded and is passed through a hole 54 in the end portion of the arm and receives a nut 55. The other end of the spring coil 52, is passed through a right-angled bend 56, on the upper end of a vertical bar 57, and is then bent at right angles and passes through a hole in the said bar, and receives a nut 58. The bar 57 is substantially V-shaped in cross section, and a second bar 58, rests in and is adjustably bolted to the said bar 57, and its lower end terminates in a short right-angled portion 59.

One end of a spring coil 60 is secured to the end of the bar 58, in the same manner as the coil 52 is secured to the bar 57, and the other end of the coil 60, passes through a hole in one of the wings of an angle plate 61, which is secured to the side spring 2 by the usual center bolt 62, which passes through the leaves of the spring at the point where the spring rests upon the axle. This end of the spring coil 60 is bent at right angles, as shown at 63 in Figure 11, and is passed through the other wing of the plate 61 and receives a nut 64. The bars 57 and 58 are adjusted as to length so that when they connect the arm 28, and the spring 2, the arm 28 will normally lie in a horizontal position. The spring coils 52 and 60 will cushion the initial thrust under the compression and rebound of the spring 2, and thus minimize the strain on the parts. The bars 57 and 58 constitute a connecting rod C.

A packing disk 65 is placed over the end of the hub 11 of the housing cap 10, and is held in place by a cap 66 which fits tightly over the said hub. A packing ring 67 is placed over the end of the hub 9 of the housing and is held in place by a cap 68 which fits tightly over the said hub. The end wall of the housing is provided with two oppositely positioned oil holes 69, which are normally closed by screws 70, the holes being on a horizontal line; and the disk 20 is provided with an oil hole 71.

The housing is filled with oil to the level of the holes 69, and the oil will pass through the hole 71 into the chamber formed by the disks 19 and 20 and ratchet ring 24, and thus keep the pawl and ratchet mechanism thoroughly lubricated.

In Figure 12 I show a screw $S^1$, which can be used in place of the screw S, particularly when the screw is arranged on the lower side of the housing, as in Figure 3. The elongated head 72 of this screw is formed with an annular groove 73 in which a packing ring 74 is placed; which ring is designed to fit so tightly in the hole of the wall 43 as to prevent leakage of oil from the housing, and also the loosening of the screw by vibration, and when this form of screw is used, the set screw 50 is dispensed with.

In practice, the improved shock absorber is arranged as shown in Figure 1, and when the car is in motion, compression of the spring, by the movement of the axle toward the car body, causes an upward movement of the lever arm 28, by means of the connecting rod C, and the pawl block 29 is turned toward the left, thereby causing the pawls 34 to ride over the ratchet teeth of the ring 24, without imparting any movement to the said ring, but instantly upon the rebound of the spring, and consequently of the body, one of the pawls 34 engages a ratchet tooth 25, and the ring is thereby turned against the frictional resistance imposed by the grip of the brake band 36 upon the brake lining 35, and the shock of the rebound is thereby absorbed. By the arrangement of pawls hereinbefore described, one pawl is always in position to engage a ratchet tooth with practically no lost movement of the pawl block, so that the force of the rebound is instantly checked. The brake hand can be caused to grip the brake lining under pressure that will impose a frictional resistance to the movement of the ratchet ring suitable to meet varying load conditions, it being apparent that with a light load, the tension on the brake band should be less than when the conditions are the reverse. The pawl and ratchet mechanism acts so quickly that even the ordinary vibratory movement of the car body on perfectly smooth roads, is practically eliminated as even the slightest rebound is checked by the instant frictional engagement of the ratchet ring with the brake lining. The spring coils 52 and 60 contribute to the shock absorbing action of the improved mechanism by cushioning the thrust and pull upon the lever arm 28, under the action of the spring 2, and the character of the mechanism as a whole is such as to enable it to meet the varying road and load conditions to which the car may be subjected.

Having described my invention, what I claim as new and desire to secure by Letters Patents is:

1. The combination with the side bar and side spring of an automobile, of a housing on said side bar, disks rotatably mounted in said housing, and a ring rigidly clamped between said disks having internal ratchet teeth, a brake band secured to the housing and extending around said ring, the ends of said band terminating in apertured ears, a screw extending loosely through said ears having an elongated head which is mounted in an aperture in the circular wall of said housing, a fixed nut on the end of said screw, a coil spring on said screw interposed between the nut and the adjacent ear, a coil spring on the screw interposed between the other ear and the head of said screw, whereby said screw when turned causes said brake band to grip said ring with a resilient pressure, a shaft axially mounted in said housing, a carrier keyed to said shaft having pawls for engaging said ratchet teeth, an arm on said shaft, and a rod connecting said arm and said side spring.

2. In a shock absorber of the character described, the combination with the side bar and side spring of an automobile, of a housing secured to said side bar having an end wall, a cap on the open end of said housing and an axial hub on said cap and said end wall, disks in said housing having hubs which fit in the aforesaid hubs, an internally toothed ratchet ring secured between said disks, a shaft mounted in said disk hubs, a circular block keyed to said shaft having spring-actuated pawls for engaging the teeth of said ratchet ring, a brake lining surrounding said ratchet ring, a resilient brake band surrounding said brake lining, means whereby said brake band is caused to grip said brake lining with regulated resilient pressure, a lever arm on one end of said shaft and a rod connecting the end of said arm and said side spring.

3. In a shock absorber of the character described, the combination with the side bar and side spring of an automobile; of a housing secured to said side bar, disks in said housing having axial hubs mounted in the ends of said housing, an internally toothed ratchet ring secured between said disks, a shaft mounted in said hubs, a circular block keyed to said shaft, having spring actuated pawls mounted in slots therein which engage said ratchet teeth, said block being recessed on its opposite sides to form air pockets, one of said disks having an oil hole therein, and normally closed oil holes being formed in one end of said housing, a brake band surrounding said ratchet ring, means whereby the brake band is caused to grip the ratchet ring with a regulated resilient pressure, a lug on said housing wall and stops on said brake band which engage said lug to prevent axial movement of the brake band, a lever arm on said shaft and a rod connecting the free end of said arm with the side spring.

4. In a device of the character described, the combination with the side bar and side spring of an automobile; of a circular housing, a cap bolted upon one end of said housing, an abutment on said cap above its axial center adapted to bear against the said side bar, abutments on said cap below its axial center adapted to bear against the front face of said side bar and also against its under side and a bolt which passes through said side bar and is threaded to the upper abutment, a friction-controlled pawl and ratchet-actuated mechanism in said housing, and means connecting said pawl and ratchet mechanism with the side spring, whereby the action of said spring is transmitted to said mechanism.

In testimony whereof I affix my signature.

FRANK N. SPRAGUE.